United States Patent
Filimonova et al.

(10) Patent No.: US 9,633,257 B2
(45) Date of Patent: Apr. 25, 2017

(54) METHOD AND SYSTEM OF PRE-ANALYSIS AND AUTOMATED CLASSIFICATION OF DOCUMENTS

(71) Applicants: Irina Filimonova, Moscow (RU); Sergey Zlobin, Moscow (RU); Andrey Myakutin, Moscow (RU)

(72) Inventors: Irina Filimonova, Moscow (RU); Sergey Zlobin, Moscow (RU); Andrey Myakutin, Moscow (RU)

(73) Assignee: ABBYY DEVELOPMENT LLC (RU)

( * ) Notice: Subject to any disclaimer, the term of this patent is extended or adjusted under 35 U.S.C. 154(b) by 157 days.

(21) Appl. No.: 14/314,892

(22) Filed: Jun. 25, 2014

(65) Prior Publication Data

US 2014/0307959 A1     Oct. 16, 2014

Related U.S. Application Data

(60) Division of application No. 13/087,242, filed on Apr. 14, 2011, which is a continuation-in-part of
(Continued)

(51) Int. Cl.
*G06K 9/00*    (2006.01)
*G06K 9/46*    (2006.01)
*G06K 9/62*    (2006.01)

(52) U.S. Cl.
CPC ..... *G06K 9/00469* (2013.01); *G06K 9/00449* (2013.01); *G06K 9/46* (2013.01);
(Continued)

(58) Field of Classification Search
None
See application file for complete search history.

(56) References Cited

U.S. PATENT DOCUMENTS

| | | | |
|---|---|---|---|
| 5,025,484 A | | 6/1991 | Yamanari et al. |
| 5,031,225 A | * | 7/1991 | Tachikawa ........... G06K 9/3208 382/185 |

(Continued)

OTHER PUBLICATIONS

Xu, et al., ""A Hierarchical Classification Model for Document Categorization"", IEEE, 2009, pp. 486-490.

*Primary Examiner* — Aaron W Carter
(74) *Attorney, Agent, or Firm* — Veronica Weinstein

(57) ABSTRACT

Automatic classification of different types of documents is disclosed. An image of a form or document is captured. The document is assigned to one or more type definitions by identifying one or more objects within the image of the document. A matching model is selected via identification of the document image. In the case of multiple identifications, a profound analysis of the document type is performed—either automatically or manually. An automatic classifier may be trained with document samples of each of a plurality of document classes or document types where the types are known in advance or a system of classes may be formed automatically without a priori information about types of samples. An automatic classifier determines possible features and calculates a range of feature values and possible other feature parameters for each type or class of document. A decision tree, based on rules specified by a user, may be used for classifying documents. Processing, such as optical character recognition (OCR), may be used in the classification process.

24 Claims, 3 Drawing Sheets

Related U.S. Application Data application No. 12/977,016, filed on Dec. 22, 2010, now Pat. No. 8,805,093, which is a continuation-in-part of application No. 10/603,215, filed on Jun. 26, 2003, now Pat. No. 7,881,561.

(52) U.S. Cl.
CPC ........... *G06K 9/6202* (2013.01); *G06K 9/626* (2013.01); *G06K 2209/01* (2013.01)

(56) References Cited

U.S. PATENT DOCUMENTS

| | | | |
|---|---|---|---|
| 5,050,222 A | 9/1991 | Lee | |
| 5,150,424 A | 9/1992 | Aguro et al. | |
| 5,182,656 A | 1/1993 | Chevion et al. | |
| 5,191,525 A | 3/1993 | LeBrun et al. | |
| 5,235,654 A * | 8/1993 | Anderson | G06F 17/243 101/485 |
| 5,257,328 A | 10/1993 | Shimizu | |
| 5,293,429 A | 3/1994 | Pizano et al. | |
| 5,386,508 A | 1/1995 | Itonori et al. | |
| 5,416,849 A | 5/1995 | Huang | |
| 5,461,459 A | 10/1995 | Muramatsu et al. | |
| 5,463,773 A | 10/1995 | Sakakibara et al. | |
| 5,793,887 A | 8/1998 | Zlotnick | |
| 5,852,676 A | 12/1998 | Lazar | |
| 5,937,084 A | 8/1999 | Crabtree et al. | |
| 6,050,490 A | 4/2000 | Leichner et al. | |
| 6,137,905 A * | 10/2000 | Takaoka | G06K 9/3208 382/173 |
| 6,151,423 A * | 11/2000 | Melen | G06K 9/3208 382/289 |
| 6,201,894 B1 | 3/2001 | Saito | |
| 6,427,032 B1 | 7/2002 | Irons | |
| 6,481,624 B1 | 11/2002 | Hayduchok | |
| 6,519,580 B1 * | 2/2003 | Johnson | G06F 17/3061 706/16 |
| 6,567,628 B1 | 5/2003 | Guillemin et al. | |
| 6,633,406 B1 | 10/2003 | Imaizumi et al. | |
| 6,640,009 B2 | 10/2003 | Zlotnick et al. | |
| 6,687,404 B1 | 2/2004 | Hull et al. | |
| 6,697,091 B1 | 2/2004 | Rzepkowski et al. | |
| 6,732,928 B1 | 5/2004 | Lawlor | |
| 6,760,490 B1 | 7/2004 | Zlotnick et al. | |
| 6,778,703 B1 | 8/2004 | Zlotnick | |
| 6,798,905 B1 | 9/2004 | Sugiura et al. | |
| 6,825,940 B1 | 11/2004 | Wu et al. | |
| 6,952,281 B1 | 10/2005 | Irons | |
| 6,993,205 B1 * | 1/2006 | Lorie | G06K 9/3208 382/290 |
| 7,151,860 B1 * | 12/2006 | Sakai | B42C 1/12 382/297 |
| 7,305,619 B2 | 12/2007 | Kaneda et al. | |
| 7,546,278 B2 * | 6/2009 | Yang | G06K 9/6282 706/14 |
| 7,610,315 B2 | 10/2009 | Chang et al. | |
| 7,644,052 B1 | 1/2010 | Chang et al. | |
| 7,672,940 B2 | 3/2010 | Viola et al. | |
| 2002/0065847 A1 | 5/2002 | Furukawa et al. | |
| 2002/0106128 A1 | 8/2002 | Zlotnick | |
| 2002/0159639 A1 | 10/2002 | Shima | |
| 2003/0086721 A1 | 5/2003 | Guillemin et al. | |
| 2003/0126147 A1 | 7/2003 | Essafi et al. | |
| 2003/0160095 A1 | 8/2003 | Segal | |
| 2003/0197882 A1 | 10/2003 | Tsukuba et al. | |
| 2004/0161149 A1 | 8/2004 | Kaneda et al. | |
| 2004/0162814 A1 * | 8/2004 | Bergholz | G06F 17/30864 |
| 2004/0162831 A1 | 8/2004 | Patterson | |
| 2005/0149846 A1 * | 7/2005 | Shimizu | G06F 17/274 715/267 |
| 2006/0010093 A1 * | 1/2006 | Fan | G06F 17/30017 |
| 2006/0028684 A1 | 2/2006 | Namizuka et al. | |
| 2006/0104511 A1 | 5/2006 | Guo et al. | |
| 2007/0059068 A1 | 3/2007 | Winter | |
| 2007/0214186 A1 * | 9/2007 | Yang | G06K 9/6282 |
| 2007/0288417 A1 * | 12/2007 | Aggarwal | G06F 17/3061 706/52 |
| 2008/0059448 A1 | 3/2008 | Chang et al. | |
| 2008/0152237 A1 | 6/2008 | Sinha et al. | |
| 2009/0097071 A1 | 4/2009 | Tsukuba et al. | |
| 2009/0132477 A1 * | 5/2009 | Zuev | G06F 17/30958 |
| 2009/0138466 A1 | 5/2009 | Henry et al. | |
| 2009/0154778 A1 | 6/2009 | Lei et al. | |
| 2009/0164618 A1 * | 6/2009 | Kudo | G06F 11/3447 709/223 |
| 2009/0175532 A1 * | 7/2009 | Zuev | G06K 9/00469 382/159 |
| 2009/0228777 A1 | 9/2009 | Henry et al. | |
| 2009/0252413 A1 * | 10/2009 | Hua | G06F 17/3025 382/170 |
| 2009/0300046 A1 * | 12/2009 | Abouyounes | G06F 17/30707 |
| 2010/0185568 A1 * | 7/2010 | Bates | G06N 99/005 706/12 |
| 2011/0013806 A1 * | 1/2011 | Zuev | G06F 17/30244 382/103 |
| 2011/0188759 A1 | 8/2011 | Filimonova et al. | |
| 2012/0036094 A1 * | 2/2012 | Takeguchi | G06T 7/0012 706/12 |
| 2012/0066166 A1 * | 3/2012 | Curbera | G06N 7/005 706/52 |
| 2012/0101974 A1 * | 4/2012 | Duan | G06N 5/048 706/52 |
| 2012/0136812 A1 * | 5/2012 | Brdiczka | G06K 9/00442 706/12 |
| 2014/0122381 A1 * | 5/2014 | Nowozin | G06N 99/005 706/12 |

\* cited by examiner

_US 9,633,257 B2_

METHOD AND SYSTEM OF PRE-ANALYSIS AND AUTOMATED CLASSIFICATION OF DOCUMENTS

CROSS-REFERENCE TO RELATED APPLICATIONS

For purposes of the USPTO extra-statutory requirements, the present application constitutes a divisional application of co-pending U.S. patent application Ser. No. 13/087,242, filed on Apr. 14, 2011, titled METHOD AND SYSTEM OF PRE-ANALYSIS AND AUTOMATED CLASSIFICATION OF DOCUMENTS, which is a continuation-in-part of co-pending U.S. patent application Ser. No. 12/977,016, filed on Dec. 22, 2010, titled METHOD OF PRE-ANALYSIS OF A MACHINE-READABLE FORM IMAGE, which is a continuation-in-part of U.S. patent application Ser. No. 10/603,215, titled METHOD OF PRE-ANALYSIS OF A MACHINE-READABLE FORM IMAGE, naming Konstantin Zuev, Irina Filimonova and Sergey Zlobin as inventors, filed 26 Jun. 2003, which issued on 1 Feb. 2011 as U.S. Pat. No. 7,881,561, which claims priority to Russian Patent Application No. 2003108433A, filed on Mar. 28, 2003, titled METHOD OF PRE-ANALYSIS OF A MACHINE-READABLE FORM IMAGE or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field of the Invention

Embodiments of the present invention relate generally to data capture using optical character recognition (OCR), and specifically to a method and system for automatic classification of different types of documents, especially different kinds of forms.

2. Related Art

According to known methods of text pre-recognition, an image is parsed into regions containing text and/or non-text regions, with further dividing said text regions into objects, containing strings, words, character groups, characters, etc.

Some known methods preliminarily use document type identification for narrowing a list of possible document types by examining the document logical structure.

According to this group of methods, the document type identification is an independent step of document analysis, forestalling logical structure identification. Only after identifying a document type and its properties list can the logical structure thereof be determined. Also, identifying document structure may be an integral part of a logical structure identification process. In this case, the document type that fits closer to the analyzed image is selected.

The document logical structure examination requires dividing the document image into elements of different types. For example, a single element of a document can contain its title, author name, date of the document or the main text, etc. The composition of the document elements depends upon its type.

Typically, the document logical structure is performed in one or more of the following ways:
  on the basis of fixed elements location,
  using a table or multi-column structure,
  on the basis of structural image identification, and
  via specialized methods for special documents types.

A method from the first group (fixed element location) requires locating fixed structural elements and involves marking fields, i.e., image regions containing elements of documents of standard form. The exact location of elements on the form may be distorted by scanning. The distortion may be one or more of various kinds: shift, a small turn angle, a large turn angle, compression and stretching.

All kinds of distortion usually can be eliminated on the first stage of document image processing.

The coordinates of regions may be found relative to the following:
  image edges,
  special reference points,
  remarkable form elements, and
  a correlation function, taking into account all or a part of the listed above.

Sometimes distortion may be ignored due to its negligibility. Then, image coordinates are computed relatively to document image edges.

Many of the methods for form type identification use special graphic objects as reliable and identifiable reference points. Special graphic objects may be black squares or rectangles, short dividing lines composed of a cross or corner, etc. By searching and identifying a reference point location, or combination of reference point locations, in a document image using a special model, the type of the analyzed form can be correctly identified.

If the number of documents to be processed is large, automated data input and document capture systems can be used. The data capture system allows scanning, recognizing, and entering into databases, documents of different types including fixed (structured) forms and non-fixed (flexible or semi-structured) forms.

During simultaneous input of documents of different types, a type of each document should be preliminary identified and selected to choose a further processing method for each document according to its type.

Generally, there are two kinds of forms—fixed forms and flexible forms.

The same number and positioning of fields is typical for fixed forms. Forms often have anchor elements (e.g. black squares, separator lines). Examples of fixed forms or marked prepared forms include blanks, questionnaires, statements and declarations. To find the fields on a fixed form, form description matching is used.

Non-fixed forms or semi-structured forms may have a various number of fields that may be located in different positions from document to document, or from page to page. Also, an appearance of a document of the same type may be different, such as the formatting, design, size, etc. Examples of the non-fixed forms include application forms, invoices, insurance forms, payment orders, business letters, etc. To find fields on a non-fixed form, matching of flexible structural descriptions of a document is used. For example, recognizing flexible forms by means of structural description matching is disclosed in U.S. Patent Application having Ser. No. 12/364,266.

A preliminary classification is used to identify a document type taking into account possible differences. After the type of document is identified, the document may be sent to a further processing corresponding to its document type.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter, as well as a preferred mode of use, are best understood by reference to the following Detailed Description of illustrative embodiments and implementations when read in conjunction with the accompanying figures.

DETAILED DESCRIPTION

Figure 1:
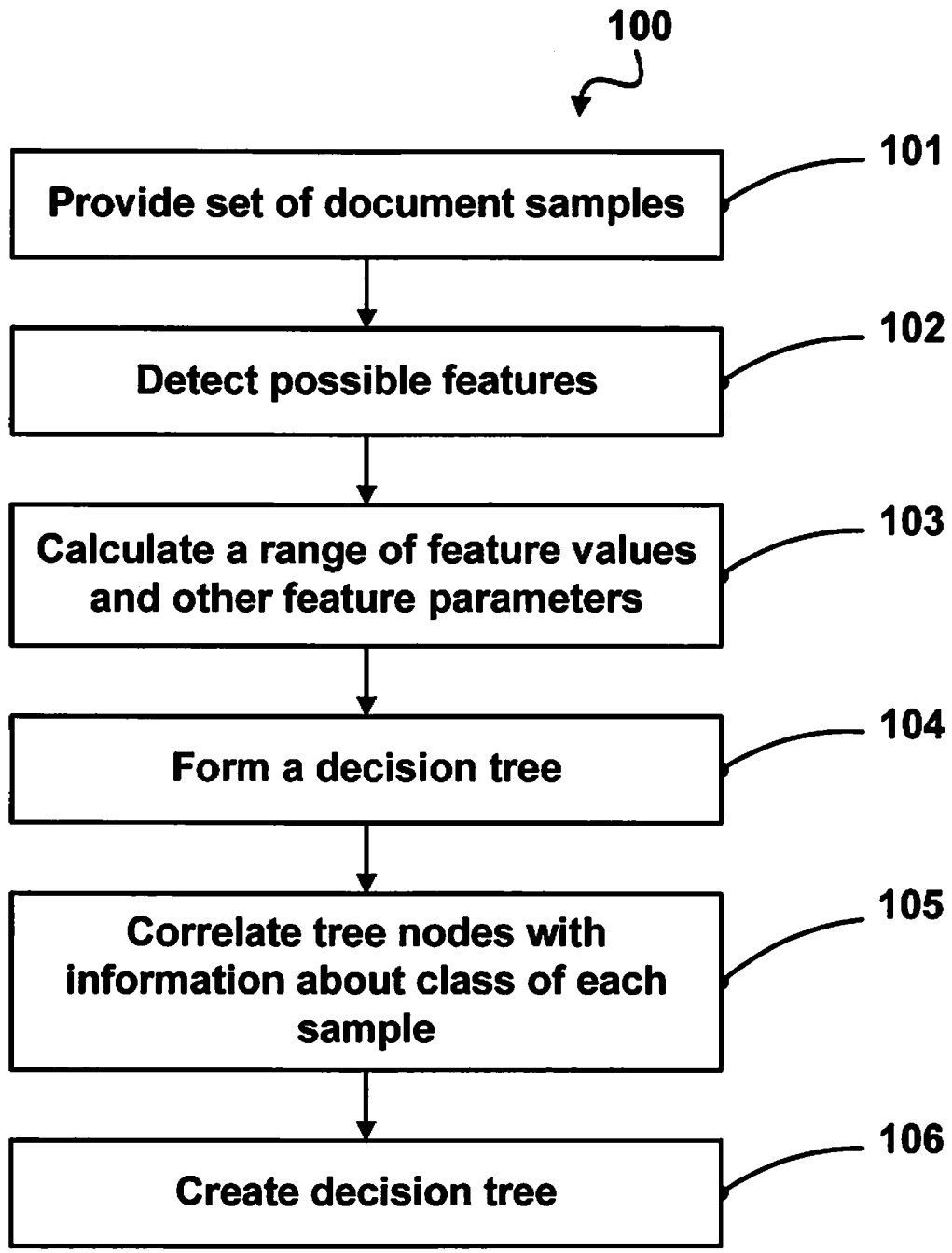
FIG. 1 shows a flowchart of an exemplary implementation of a method for training an automatic classifier.

While the invention is described below with respect to a preferred implementation, other implementations are possible. The concepts disclosed herein apply equally to other methods, systems and computer readable media for document type identification and training one or more decision trees. Document type identification and training may be done for fixed forms and non-fixed forms. Furthermore, the concepts applied herein apply more generally to all forms of scanning and automated classification of documents generally, and forms specifically. The invention is described below with reference to the accompanying figures.

The proposed method of the invention is preferably used for document type identification during data capture from various paper documents into electronic information system for data storage, analysis and further processing.

Some of the technical results achieved by using the invention include gaining universality of the pre-recognition analysis of different forms, gaining an ability to process document images of more than one form type in one session, gaining an ability to process document images in different directions and spatial orientation, and gaining an ability to perform the pre-recognition process with high output or high throughput. The spatial orientation of a document image may be identified preliminarily, for example, by the method disclosed in the U.S. Pat. No. 7,881,561. All subject matter of U.S. Pat. No. 7,881,561 and of any and all parent, grandparent, great-grandparent, etc. applications of its Related Applications is incorporated herein by reference to the extent such subject matter is not inconsistent herewith.

In an exemplary embodiment, one or more objects are assigned on the form, composed of a graphic image, which allows defining form type unambiguously. Additionally, one or more supplementary form objects may be assigned to receive a profound form type analysis such as when, for example, two or more forms are close in appearance or in set of features. The features of graphic image may be described or identified by another special model used for form type definition. The said features described by said another special model may be stored in a special data storage means, one of the embodiments of which is a form model description.

After converting a form to an electronic state or form image, the form image is parsed into regions containing text objects, images, data input fields, special reference points, lines and other objects, etc.

Any distortion caused by converting a document to an electronic state is eliminated or reduced from the form image.

The objects, comprising one or more graphic images for form type definition, are identified on the form image. The matching model is selected via identification of the said form image. In the case of multiple identifications, or association of the document with more than one document type, a profound analysis of the form image is performed to determine its mostly likely form type. The profound analysis comprises creation of a new special model for form type identification, a new model comprises a primary special model plus identification of one or more supplementary form objects. The form image receives a supplementary identification using an implementation of the new special model.

A profound analysis may be performed fully or partly automatically.

One or more form objects presented in the form image may be described in one or more alternative ways for their further identifying.

After classification, each document may receive further processing, and a method of processing may be selected according to a particular or identified document type—one that corresponds to the newly classified document.

In another embodiment, the disclosed method allows a way to train a data capture system to distinguish documents of different types automatically using a set of preliminary specified samples. The said method allows a system to achieve a good result by training on a small set of samples, such as, for example, about 3-5 examples for each document type. A batch of samples of more than one type used at one time to train a system. The method is primarily intended for document type identification during data capture of different printed forms, but it can be used for identification of any other type of document, such as, but not limited to, newspapers, letters, research papers, articles, etc. The training results of identification may be saved as a system internal format file, such as a binary pattern, and such system internal format file may then be used for classification of document images of, or associated with, an input stream.

In an exemplary implementation of the invention, the classification system comprises one or more trees of classes (decision trees), the said trees may be one or more automatically trainable decision trees based on features which were identified and calculated in a training process (automated classifier) and one or more decision trees based on rules specified by a user (rule-based classifier). A tree of classes in a simplified form may be presented as a list of its nodes which may be considered final classes. The goal of classification is to attribute or associate with an input image, one or more finite classes using the system of trained decision trees.

The system allows adjusting a document classifier to any number of different document types, which may be entered in random order, and the system may be trained to distinguish documents that have visually similar examples within a type, as well as types which have very different examples from document to document or from page to page.

Document types that have visually similar appearances (similar document samples within one type) may be rapidly and accurately identified by the automated classifier. Document types that have visually very different examples or samples, as considered from document to document, are best identified by means of a rule-based tree. By using the automated classifier, and/or the rule-based classifier, or their combination for document type identification during data capture of document images, allows the system to reach a high level of quality and accuracy in terms of identification of a document type.

After classification, a document may be sent for or receive further processing. In a particular implementation, a processing method may be selected automatically or manually according to a document type. Thus, further processing may occur automatically or manually.

Automated Classifier Training

FIG. 1 shows a flowchart of an exemplary implementation of a method for training an automatic classifier. With reference to FIG. 1, the automated classifier is trained on or with some document samples (101) of each class or document type. During training, the type (class) of each sample is known in advance. In training, the system determines possible features (102) and calculates a range of feature values and possibly other feature parameters (103) for each document type or class. Features may be predefined or/and may be determined dynamically.

Various types of features may be used for training the system based upon, for example, the following features or types of features: Raster, Titles, different Image Objects (such as separators, barcodes, Numeric Code, Non-Human Readable Marking, etc.), Text, Word, etc. The features of the same type may be allocated among various groups, such as groups corresponding to types of features. A decision tree for each group may be created and trained independently, so several automated classifiers may be created in such way. Additionally, a profile for training and classification may be specified. A profile comprises settings for a training process. For example, a profile may include feature groups that are used in the training process, or a minimal number of samples on which one feature should be found to be considered as reiterating or re-occuring, but not as a chance feature for a given class.

For a feature group "Raster" that is declared in a profile, the system creates, during training, a raster pattern for each document type. In one implementation, the raster pattern is created in the form of a reduced grayscale copy of an image where for each pixel of the image the system stores an average value of black calculated on the basis of one or more preliminary samples.

During classification, a reduced grayscale copy of a document is compared with one or more raster patterns, and a degree of the difference between a pattern and a new document image is calculated, so one or more estimations of similarity between the new image and patterns of known classes are obtained. Such group of features is quite appropriate for classification of fixed (structured) forms, as well as for flexible forms if the flexible forms have a repeating header (heading) or footer of the document.

For a feature group "Titles" that is declared in a profile, the system analyses an image of a scanned training document samples and selects one or more large graphic objects with physical properties typical for text objects on that image. These objects are identified as document titles, recognized by optical character recognition (OCR) or other means, and then the resultant text strings are used as one or more features of the trained class. The system calculates a frequency of occurrence of each detected title on samples forming the decision tree with descending order of the found samples number which contain the title or parts or all of the text of the title.

For example, if the word "Invoice" is found on 20 of 50 samples, the system forms two classes of automated decision tree: (1) a node that presents images containing the word "Invoice", and (2) a node "remainder" that presents images that do not contain the word "Invoice". If the title "ProviderName1" is found on 5 of 20 sample images corresponding to the node "Invoice", and the title "ProviderName2" is found on 3 of 20 sample images corresponding to the node "Invoice", and the title "ProviderName3" is found on 7 of 20 sample images corresponding to the node "Invoice", then the node "Invoice" will have 3 daughter nodes "ProviderName1", "ProviderName2", "ProviderName3". Each created node may have child-nodes consistent with the presence of various titles, with the most frequent titles (found on, for example, the most number of samples) are taken into account. Titles that are found on a number of samples that is less than a value defined for a profile are not taken into account during forming a decision tree. Additionally, features of spatial allocation of separate words belonging to the title may be used for further generating of nodes, subnodes or both nodes and subnodes.

Using title text (one or more words in each title) allows high accuracy classification of documents. This profile component (recognition of titles) allows a system to unite documents with different spatial allocations of key words into a respective class. Of course, documents may be sorted into more than one class based on this feature or a combination of features. In a preferred implementation, a time required for classification by title is much less than a time to perform a full document recognition or character recognition of the document.

For a feature group "Image Objects" that is declared in a profile, the system uses classification features which comprise information about and/or from various graphical objects in a form image. The graphical objects are, for example: black separators, bar codes, pictures, text strings, etc. Similar to forming a decision tree by "Titles", the system is capable of creating a decision tree by a frequency of occurrence of each graphical object on page or form samples. A more detailed splitting of decision tree nodes is implemented by employing information about, but not limited to, spatial allocation and number of objects of each type on a sample page or form; types of bar-codes; mutual allocation of separators; mutual allocation of text strings and/or paragraphs.

In addition to or instead of black separators on samples, one or more geometrical structures of various types may be taken into account. For example, "separators forming frames", "long vertical separators", "T-shaped intersection of separators (vertical and horizontal)", "separators forming corners", "+-shaped intersection of separators", "separators forming tables", etc. In an exemplary implementation, feature checking is performed in order from more common to more specific features. For example, at first the presence of separators is checked, then the presence of their intersections, then the presence of separators forming tables.

It is possible to use other groups of features which are usable (appropriate) for classification of documents. For example, a full-text pre-recognition may be performed, and some words, which are typical for a document type may be used as features of a full-text classifier.

For said groups of features, specific profiles may be created. For example, such profiles would only operate with Raster features, Titles features, or with combinations such as "Raster with Titles", "Raster with Titles and Image Objects" and others. If only a few samples of each type of document are used for training, for example 3-5 samples, then a minimal number of pages with a trained feature may be declared, for example 3.

For some of said feature groups the range of permissible values (maximum and minimum) may be calculated and stored during the training process (103). For example, in a classification process of complex document types, more samples may be used for more accurate training; with a sufficient number of samples, a standard deviation of features, or other characteristics, may be calculated that is typical for each class.

Thus, in the process of training the decision tree is formed (104) on the basis of a predefined set of features, or a set of features that is found dynamically without being predefined. The nodes of said tree are correlated with information about classes (105) that document samples corresponding to each node had. Further this information may be used in classification processing to classify a new image corresponding to such node.

In an example of training, 80% of samples attributed to a given node are invoices, 15% of the samples attributed to the given node are price lists, and 5% of the samples attributed to the given node are orders. On the basis of this information, the probability for a new form or document image (one that is newly being classified) to correspond to each class may be estimated. One of the classes may be selected.

Classification

After the auto-classifier is trained (106), one or more decision trees with nodes are created. The one or more decision trees are associated with calculated ranges of permissible feature values arc stored and/or their average values and/or other characteristics (parameters) of the features.

In an exemplary implementation, a procedure of classification runs top-down (from the root of the tree) and performs checking. Checking may comprise determining if a feature value of a new image entering is within the range of permissible values for nodes of the current level. If a particular feature value occurs within such a range, then the image may be attributed to the node. Then the checking is executed for the child-nodes. And, further the checking is repeated until the document image is attributed to a final node of the decision tree, or to an intermediate node and cannot be attributed to any child-node.

The system keeps information obtained during training, in particular, the system records how many samples of each class was attributed to each node. The system may also be configured to record the number of document images that are classified and associated with each node over time. Thus, the system may increase its training over time.

A new image may be classified by means of all decision trees available in the system. For probability calculating, a reliability of a feature group may be taken into account, for example, a reliability index for each classifier (decision tree) may be preliminarily assigned. After that, a total estimation of probability may be calculated. A document in the process of being classified may be considered as classified by the class that is determined to have the best estimation or value of probability that the document belongs to that class.

In a case where several classes have an estimation value that are close together or close to the best value (such as within a certain percent, standard deviation, etc.), the image may be classified in several classes, or a profound or more complex analysis may be performed to distinguish and identify the closest match to a single class. Other supplementary information for classification may be used. In a case where the best rating is too low (such as below a predetermined threshold value assigned to the class, tree or profile), the document is classified as an "unknown class" document.

Automated Building of a System of Classes

In one embodiment of a method, a decision tree is formed on the basis of determined features. The method allows a system to build a generalized tree taking account of groups of classification features. Nodes at a top level in such decision tree are formed on the basis of one or more of the most reliable features, for example, the presence of titles. Child-nodes may be built on the basis of other features that identify the image less reliably.

Forming such a decision tree on the basis of a wide set of unknown diverse images allows a system to perform an automated initialization of a system of classes, a classifier. All given samples are analyzed by the system. Features that should be used or can be used for classification are defined. A decision tree is formed on the basis of one or more of the features found during training or initial classification.

Example of an Embodiment

The first node (class) is automatically assigned as "Unknown Document". Names for the nearest child-classes are selected in accordance with titles found on a large number single-type images of forms. Thereby, the first child-classes may be "Invoice", "Price", "Bill", etc.

Names for one or more next child-classes allows for making or identifying of subclasses of images. These subclasses may each be given a description of subclasses of images, and could be specified by names of found features. For example, these subclasses could be "wide table" and "absence of separators". As a further example, a next set of subclasses may be named "Invoice with a table of black separators", "Price-list with barcodes", etc.

The method of the present invention allows a system to distribute rapidly to one or more folders a huge number of unknown document images based on a similarity of appearance, and to give to the one or more folders human-readable names. And the process of automating the building of a decision tree does not require any prior information about types (classes) of given documents.

Rule-Based Classifier

Description of Classification Nodes

The rule-based classifier uses a decision tree specified by a user. Such classifier may be trained on all types of documents and can distinguish any document entered into a system, or it may act as a differential classifier that contains information about selective classes. Additionally, it could be used to differentiate between two or more overlapping or similar classes or for training complicated or otherwise difficult class recognition.

In each node of a decision tree of a rule-based classifier, a small flexible description (further Id-element) is used as a feature that allows allocating the image to a given node. Usage of such descriptions for document type definition was described in more detail in U.S. patent application Ser. No. 12/877,954. All subject matter of the application with Ser. No. 12/877,954 and of any and all parent, grandparent, great-grandparent, etc. applications of its Related Applications is incorporated herein by reference to the extent such subject matter is not inconsistent herewith. If an Id-element is matched to an image, then the image corresponds to the given node. A class to which the document image should belong is specified as a tree node.

For each tree node some confidence may be assigned on purpose to reduce the number of steps at tree traversal, steps that are necessary to classify a document. Such confidence may be regarded as the degree of node uniqueness.

In an exemplary embodiment, the following degrees of node uniqueness may be used.

The node "unique in tree" may be a unique node within a tree or may be globally unique (e.g. across a system, across a set of trees, across a relevant subset of trees). Such nodes are used for document types where there is a reliable identifying element, for example, a text line or several lines which take place only on the given document type. The Id-element of such a node identifies the document type unambiguously. If it matches a document, then the node is a final result and there is no need to examine the others nodes.

The node "Unique on its tree level" is unique in a set of sibling nodes or locally unique. The identifying element of a locally unique node distinguishes document types within the limits of a parent node. It is possible to arrange features that are common to all subtypes of documents in the identifying element of the parent node (for example "Invoice"), then to distinctive features of the subtypes (for example, keywords like "ProviderName1", "ProviderName2" and etc., or separator grid which is typical for the subtype) and may be arranged by Id-element of its subtype. An adjacent parent node (for example, with an Id-element containing keyword "Price") may have the same subtypes with the keywords "ProviderName1", "ProviderName2" and etc. Such node allows reducing tree traversal within one branch. If Id-element of the node matches a document, then there is no need to examine the sibling-nodes.

The node "non-unique" is not unique or it is not intended for identification (but only for subclass grouping). Such nodes are generally used for convenient tree representation, and for logical grouping of child nodes.

Figure 2:
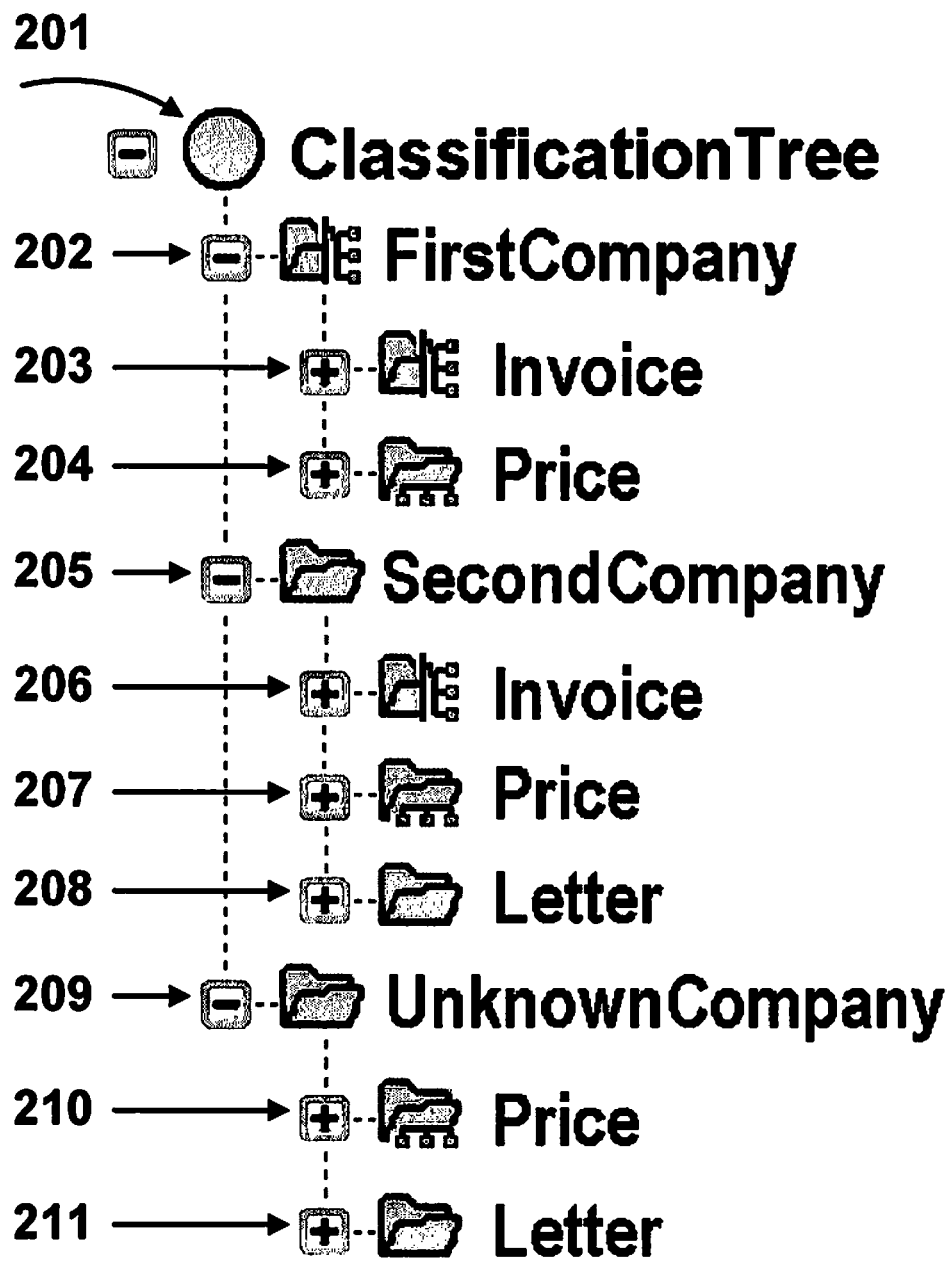
FIG. 2 shows a decision tree of a rule-based classifier according to an exemplary implementation of a method of classification.

FIG. 2 shows an example of a decision tree of a rule-based classifier that can identify different documents such as from different companies. In the tree, documents from a particular company are sorted into separate classes and are designated or described as subclasses. The nodes 202, 203 and 206 are assigned as "unique in the tree"; nodes 204, 207 and 210 are assigned as "unique on its tree level"; nodes 205, 208, 209 and 211 are assigned as "non-unique."

According to an exemplary implementation, an analysis of a document image starts from the base of a tree—the element Classification Tree (201). Matching of a document image with the identifier of globally unique class or node First Company (202) is checked first. If the class (202) is matched, only its subclasses (203 and 204) are considered. If the document image does not match or correspond to the First Company, the document image is checked against classes Second Company (205) and Unknown Company (209). The document may be matched with one of them, as well as with both classes (because the Second Company and Unknown Company classes (205 and 209) are non-unique).

If the document image is related to the class First Company (202), then only its subclasses are checked. At first, the subclass Invoice (203) is checked because it is globally unique and Price (204) is locally unique. If no subclass is matched, the document image is classified as First Company (202). Turning to the situation where the class identifier First Company (202) is not matched, if only one of two company classes (205 or 209) is matched, its respective subclasses are successively checked, as it described above. If both classes are matched, then for each of them, each of their respective subclasses is checked.

In the process, if subclass SecondCompany.Invoice (207) is matched, tree traversal stops, the page is classified by the subclass (because it is globally unique).

However, if subclasses of different classes are matched (e.g., SecondCompany.Price (208) and UnknownCompany.Price (210) are matched simultaneously), they both are added to the results of classification.

If one of the company classes (205 or 209) has no matched subclass, then the class is added to the results of classification by itself.

Classification Order

Before beginning any node Id-element matching in a classification tree, a text pre-recognition process may be performed on an entire document image or its pre-defined parts. Thereby, the rule-based classification process usually needs more time than an automatic classification.

Classification is performed step by step starting with the base node. All nodes that have a description that matches a respective portion of a document image are added to the results of classification. In each step, nodes-classes that can classify the document are chosen. Further their child nodes (subclasses) are considered. The process is repeated until all appropriate child nodes (subclasses) are considered. If in some stage there is no suitable child node, a current or parent node is added to a result of classification by itself.

The choice of nodes for traversal continuation of a classification tree is performed as follows. First, globally unique nodes from the set of the base node children are matched in the order they are described in the classification tree. At successful matching of an identifier, the tree traversal stops and the child-nodes of the corresponding class are identified as the only possible matches in the traversal of the tree.

If there is no suitable globally unique node then locally unique nodes are matched in the order by which they are described in the classification tree. When an identifier is matched, the tree traversal stops and the matching child-nodes of the selected or current class are added to possible ways of traversal continuation of the classification tree.

If there is no matched unique class, then non-unique nodes are checked. Subnodes of all matched non-unique classes are added as possible ways of traversal continuation of classification tree. Subsequently, subnodes of chosen way continuations are considered in a similar manner. If child-nodes of different classes are matched, they both will be added to results of classification. If a parent class has no matching subclass or subnode, the parent class is added to the results of classification by itself without any of its respective subclass or subnode.

Combined Operation Mode of Automatic and Rule-Based Classifier

In a preferred implementation, the classification system can operate in 3 modes: automatic, rule-based and combined. The first two operation modes are described above. In a combined mode, an automatic classifier runs first in a faster mode.

If the image was classified by one class, the classification process stops and rule-based classifier is not used for the present document image.

If the image was classified by several classes, at this point the classification process may be finished and the several classes are added to the classification result or the rule-based classifier may be run to clarify, reduce or improve the result and to make a final selection of one or more classes and/or subclasses.

If the document image was not classified, then a rule-based classifier is additionally run which outputs its classification result. If the document image is not classified after being subjected to the rule-based classifier, it is attributed to an "unknown document" class.

In a combined classification mode, some classes can be defined as unconfidently classified by the automatic classifier. Such a class may be additionally checked by a rule-based classifier. In another case or scenario, if the results of two classifiers are different, both results may be considered as possible classes for the document image.

After document classification, a document image may be sent for or subjected to processing in accordance with its type, class or according to a combination of types to which it was assigned. Such processing may be, for example, full recognition of a document (OCR), recognition of one or more predefined document areas, matching with one or more structured descriptions of the given document type, saving of the document image in an electronic format in a predefined folder, information searching and populating of a database, document deletion, etc.

Figure 3:
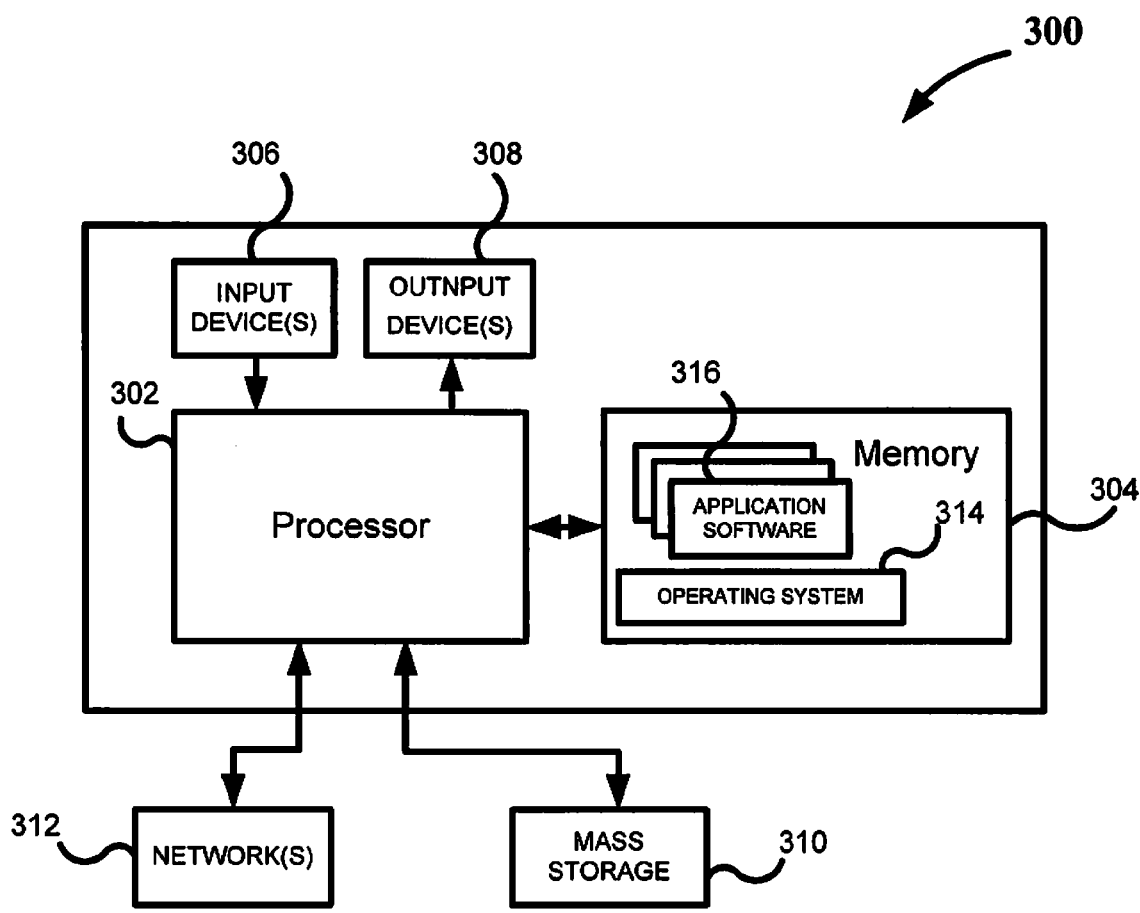
FIG. 3 shows an exemplary computer system or hardware and/or software with which the present invention may be implemented.

FIG. 3 of the drawings shows an exemplary hardware 300 that may be used to implement the present invention. Referring to FIG. 3, the hardware 300 typically includes at least one processor 302 coupled to a memory 304. The processor 302 may represent one or more processors (e.g. microprocessors), and the memory 304 may represent random access memory (RAM) devices comprising a main storage of the hardware 300, as well as any supplemental levels of memory, e.g., cache memories, non-volatile or back-up memories (e.g. programmable or flash memories), read-only memories, etc. In addition, the memory 304 may be considered to include memory storage physically located elsewhere in the hardware 300, e.g. any cache memory in the processor 302 as well as any storage capacity used as a virtual memory, e.g., as stored on a mass storage device 310.

The hardware 300 also typically receives a number of inputs and outputs for communicating information externally. For interface with a user or operator, the hardware 300 may include one or more user input devices 306 (e.g., a keyboard, a mouse, imaging device, scanner, etc.) and a one or more output devices 308 (e.g., a Liquid Crystal Display (LCD) panel, a sound playback device (speaker).

For additional storage, the hardware 300 may also include one or more mass storage devices 310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 300 may include an interface with one or more networks 312 (e.g., a local area network (LAN), a wide area network (WAN), a wireless network, and/or the Internet among others) to permit the communication of information with other computers coupled to the networks. It should be appreciated that the hardware 300 typically includes suitable analog and/or digital interfaces between the processor 302 and each of the components 304, 306, 308, and 312 as is well known in the art.

The hardware 300 operates under the control of an operating system 314, and executes various computer software applications, components, programs, objects, modules, etc. to implement the techniques described above. In particular, the computer software applications may include a client dictionary application, in the case of the client user device 102. Moreover, various applications, components, programs, objects, etc., collectively indicated by reference 316 in FIG. 3, may also execute on one or more processors in another computer coupled to the hardware 300 via a network 312, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A non-transitory machine-readable storage medium having instructions that, when executed by a processing device, cause the processing device to perform operations comprising:
    identifying a plurality of document features in a document image;

correlating each of the plurality of document features with one or more of different document classes;
selecting a first group of document features and a second group of document features from the plurality of document features based on document feature types of the plurality of document features;
for the first group of document features, generating a first decision tree that includes one or more nodes corresponding to document features of a document feature type corresponding to the first group;
for the second group of document features, generating a second decision tree that includes one or more nodes corresponding to document features of a document feature type corresponding to the second group; and
associating the document image with one of the different document classes based at least in part on the first decision tree and the second decision tree.

2. The non-transitory machine-readable storage medium of claim 1, wherein:
the feature is a feature that was previously determined to be a feature capable of distinguishing the document image or a document that comprises the document image, and
the feature was previously identified by analysis of a plurality of training documents each having at least one unique feature different from at least one of the other training documents.

3. The non-transitory machine-readable storage medium of claim 2, wherein:
the feature is associated with a feature type,
identifying the feature in the plurality of training documents further comprises identifying a corresponding feature type for the feature, and
a feature type decision tree is generated that comprises the feature type.

4. The non-transitory machine-readable storage medium of claim 3, the operations further comprising generating a second node corresponding to the class associated with the decision tree.

5. The non-transitory machine-readable storage medium of claim 3, wherein the feature type is: a raster, a title, an image object, a text string, a word, a unique mark, a unique character, a numeric code, or a non-human readable marking.

6. The non-transitory machine-readable storage medium of claim 2, wherein:
the feature is predefined, and
the identifying the feature in the document image further comprises performing optical character recognition (OCR) on the feature in the document image.

7. The non-transitory machine-readable storage medium of claim 2, wherein:
the associating the document image with the class further comprises:
determining a value from the document image, and
determining a reliability index of the decision tree, wherein the reliability index is based on the identified feature of the document image.

8. The non-transitory machine-readable storage medium of claim 2, wherein the operations further comprise identifying an object in the document image prior to the identifying the feature in the document image, wherein the identifying the feature in the document image comprises identifying the feature in the object.

9. A method comprising:
identifying a plurality of document features in a document image;
correlating each of the plurality of document features with one or more of different document classes;
selecting a first group of document features and a second group of document features from the plurality of document features based on document feature types of the plurality of document features;
for the first group of document features, generating a first decision tree that includes one or more nodes corresponding to document features of a document feature type corresponding to the first group;
for the second group of document features, generating a second decision tree that includes one or more nodes corresponding to document features of a document feature type corresponding to the second group; and
associating the document image with one of the different document classes based at least in part on the first decision tree and the second decision tree.

10. The method of claim 9, wherein:
the feature is a feature that was previously determined to be a feature capable of distinguishing the document image or a document that comprises the document image, and
the feature was previously identified by analysis of a plurality of training documents each having at least one unique feature different from at least one of the other training documents.

11. The method of claim 10, wherein:
the feature is associated with a feature type,
identifying the feature in the plurality of training documents further comprises identifying a corresponding feature type for the feature, and
a feature type decision tree is generated that comprises the feature type.

12. The method of claim 11, further comprising generating a second node corresponding to the class associated with the first decision tree.

13. The method of claim 11, wherein the feature type is: a raster, a title, an image object, a text string, a word, a unique mark, a unique character, a numeric code, or a non-human readable marking.

14. The method of claim 10, wherein:
the feature is predefined, and
the identifying the feature in the document image further comprises performing optical character recognition (OCR) on the feature in the document image.

15. The method of claim 10, wherein:
the associating the document image with the class further comprises:
determining a value from the document image, and
determining a reliability index of the first decision tree, wherein the reliability index is based on the feature of the document image.

16. The method of claim 9, wherein the method further comprises:
identifying an object in the document image prior to the identifying the feature in the document image, wherein the identifying the feature in the document image comprises identifying the feature in the document object.

17. A system comprising:
a storage device;
a processor coupled to the storage device, the processor to:
identifying a plurality of document features in a document image;
correlate each of the plurality of document features with one or more of different document classes;

selecting a first group of document features and a second group of document features from the plurality of document features based on document feature types of the plurality of document features;

for the first group of document features, generate a first decision tree that includes one or more nodes corresponding to document features of a document feature type corresponding to the first group;

for the second group of document features, generate a second decision tree that includes one or more nodes corresponding to document features of a document feature type corresponding to the second group; and associate the document image with one of the different document classes based at least in part on the first decision tree and the second decision tree.

18. The system of claim 17, wherein:

the feature is a feature that was previously determined to be a feature capable of distinguishing the document image or a document that comprises the document image, and the feature was previously identified by analysis of a plurality of training documents each having at least one unique feature different from at least one of the other training documents.

19. The system of claim 18, wherein:

the feature is associated with a feature type, identify the feature in the plurality of training documents further identifying a corresponding feature type for the feature, and a feature type decision tree is generated that comprises the feature type.

20. The system of claim 19, further comprising generate a second node corresponding to the class associated with the decision tree.

21. The system of claim 19, wherein the feature type is: a raster, a title, an image object, a text string, a word, a unique mark, a unique character, a numeric code, or a non-human readable marking.

22. The system of claim 18, wherein:

the feature is predefined, and to identify the feature in the document image, the processor is further to perform optical character recognition (OCR) on the feature in the document image.

23. The system of claim 18, wherein:

to associate the document image with the class, the processor is further to:

determine a value from the document image and determine a reliability index of the decision tree, wherein the reliability index is based on the feature of the document image.

24. The system of claim 17, wherein the processor is further to: identify an object in the document image prior to the identifying the feature in the document image, wherein to identify the feature in the document image, the processor is further to identify the feature in the object.

* * * * *